Nov. 9, 1926.
R. O. MYERS
1,606,094
AUTOMOBILE SHIELD
Filed June 4, 1924
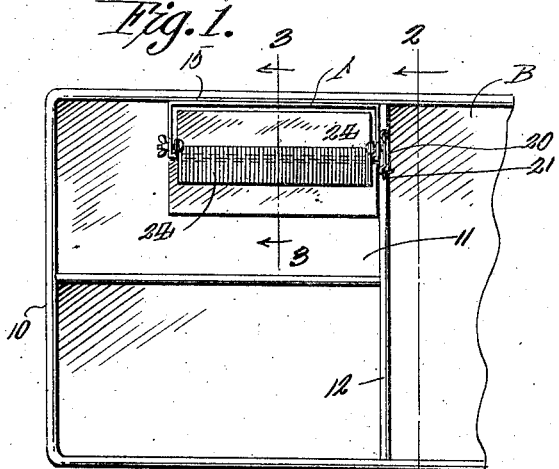
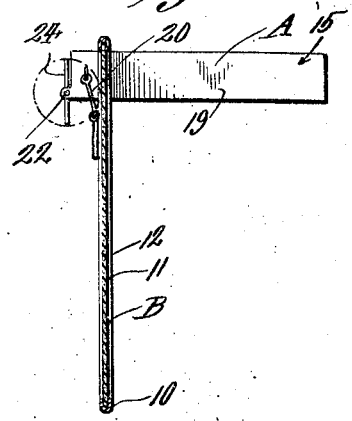
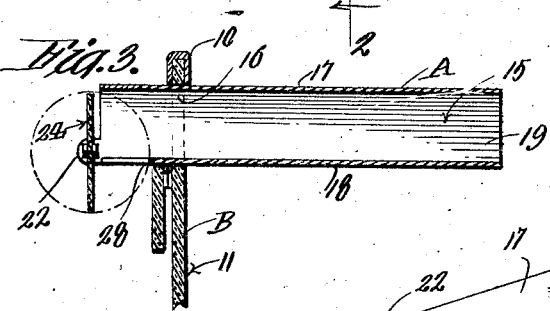
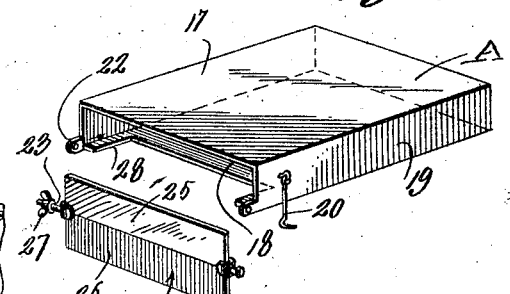
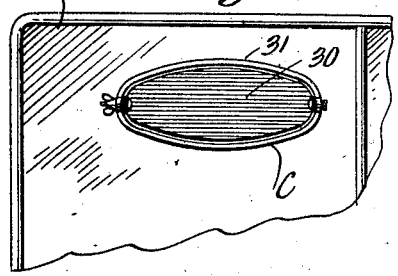
WITNESSES
Inventor
R.O. MYERS
By
Attorney Patented Nov. 9, 1926.

1,606,094

UNITED STATES PATENT OFFICE.

RICHARD O. MYERS, OF LEECHBURG, PENNSYLVANIA.

AUTOMOBILE SHIELD.

Application filed June 4, 1924. Serial No. 717,814.

This invention appertains to automobile appliances and the primary object of the invention is to provide a novel attachment for the wind shield of a vehicle for facilitating driving in rainy or snowy weather, the attachment being so arranged as to insure clear vision to the driver of the vehicle at all times.

A further object of the invention is the provision of a shade attachment for automobiles embodying colored lens which can be arranged in the line of vision of the driver of the vehicle facilitating the driving of the vehicle against the sun or which can be moved out of the path of the driver's vision so that a clear unobstructed view can be had when so desired.

A further object of the invention is the provision of a sight tube arranged to project forwardly through the wind shield of a vehicle, the sight tube insuring a clear vision to the driver of the vehicle when the wind shield becomes coated with rain or snow, the sight tube also having associated therewith a pivoted lens or plate provided with a colored portion which can be moved into registration of the sight tube on sunny days for eliminating the glare on the driver's eyes, and a clear portion which can be moved into alignment with the sight tube for use in rainy or snowy weather.

A further object of the invention is the provision of novel means for holding the sight tube in place on the wind shield against accidental displacement and novel means of holding the lens or plate in its adjusted position relative to the sight tube.

A still further object of the invention is to provide an improved attachment on the wind shield of automobiles of the above character which will be durable and efficient in use, one that will be simple and easy to manufacture and one which can be placed upon the market and incorporated with a wind shield at a small cost.

With these and other objects in view the invention consists in the novel construction, arrangement and formation of parts, as will be hereinafter more specifically described, claimed, and illustrated in the accompanying drawings, in which drawings—

Figure 1 is a fragmentary rear elevation of a wind shield showing the improved device incorporated therewith, Figure 2 is a transverse section through a wind shield taken on the line 2—2 of Figure 1, looking in the direction of arrows, the attachment being shown in side elevation, Figure 3 is a detail sectional view taken on the line 3—3 of Figure 1, showing the attachment in longitudinal section, Figure 4 is a perspective view of the improved attachment, Figure 5 is a fragmentary rear elevation of a wind shield showing a modified form of the attachment incorporated therewith.

Referring to the drawings in detail wherein similar characters designate corresponding parts throughout the several views the letter A generally indicates the improved attachment and B a windshield with which the same can be incorporated. The wind shield B can be of the usual or any preferred character and includes the ordinary frame 10 for supporting the glass plate 11. If so desired the frame 10 can be provided with a central vertical strut 12.

The improved attachment A comprises a tube 15 constructed from sheet metal or the like and this tube can be of any desired cross-sectional configuration, and as shown the same is of a substantial rectangular shape in cross-section. The sight tube 15 is formed relatively long so that the same can project forwardly from the wind shield B an appreciable distance. The wind shield plate 11 has formed directly therein below the upper bar of the frame 10 with an opening 16 through which the tube 15 projects. The sight tube 15 embodies a flat upper wall 17, a lower flat wall 18, and connecting side walls 19. The tube is adapted to fit snugly against the walls of the opening 16 and is held against displacement therefrom by the usual or suitable catch 20 which is carried by the tube and is adapted to engage an eye 21. The lower ends of the side walls 19 carry rearwardly projecting pivot ears 22 and these pivot ears rotatably receive pivot pins 23 carried by the terminals of the shade plate 24. These pins are arranged in longitudinal axis of the shade plate, and the shade plate includes a clear portion 25 and a colored portion 26 and it is obvious that by rotating the shade plate that either the clear portion 25 or the colored portion 26 are brought into registration with the rear end of the sight tube or that the shade plate can be brought into parallel relation to the lower wall 18 so that an unobstructed view can be had through the tube.

In order to hold the shade plate in its various adjusted positions one of the pins 23 is threaded for the reception of a nut 27 which is adapted to be threaded into tight contact with one of the pivot ears 22. As clearly shown in Figures 3 and 4 of the drawing the lower wall 18 of the sight tube can be cut away as at 28 to permit the easy rotation of the said shade plate.

Now in rainy or snowy weather, when the wind shield becomes smeared or coated with rain or snow a clear view can always be had through the tube and the shade plate can be adjusted so as to bring the clear portion 25 thereof in alignment with the tube which will effectively prevent the wind from blowing into the driver's eyes. On sunny days when the driver of the vehicle is driving directly against the sun the shade plate 24 can be adjusted so as to bring the colored portion 26 thereof into alignment to the sight tube which will effectively eliminate the glare and permit the easy driving of the vehicle.

In Figure 5 of the drawing I have suggested a modified form of the attachment C which embodies a shade plate 30 of substantial oval form. This shade plate 30 is rotatably mounted in the oval-shaped frame 31 which is set into a suitable opening formed in the wind shield. This shade plate is preferably formed wholly of colored glass so as to eliminate the glare but the shade plate can be turned horizontally to permit an unobstructed view to be had through the shield when it is not necessary to employ a colored lens. This shade plate 30 is held in its adjusted position in the same manner as the shade plate 24.

From the foregoing description it can be seen that I have provided a novel attachment for automobiles which will facilitate the driving thereof on rainy and snowy days and the like.

Changes as in detail may be made without departing from the spirit or scope of this invention, But what I claim as new is:

1. The combination with a wind shield provided with an elongated opening, of a substantially rectangular open-ended casing extending at right angles to the wind shield and having one end accommodated in said opening, pivot ears carried by the casing, and a rotatably mounted anti-glare element having pivot pins received within the said ears.

2. The combination with the wind shield of an automobile having an opening therein, of an attachment for the wind shield comprising a tube fitted into the opening and arranged to project forwardly from the opening, a shade plate rotatably carried by the rear end of the sight tube at the lower edge thereof, the shade plate being mounted at its longitudinal axis and provided with a clear portion on one side of the longitudinal axis and a colored portion on the opposite side of the longitudinal axis, the shade plate being mounted to permit either the clear or the colored portion thereof to be moved into alignment with the sight tube or in a horizontal plane parallel with the bottom wall of the tube, and means for holding the shade plate in an adjusted position.

3. The combination with a wind shield provided with an elongated opening, of a substantially rectangular open-ended casing extending at right angles to the wind shield and passing through said opening, pivot ears carried by the inner end of the casing, an anti-glare element, and pivot pins carried by the said element and received within the said ears, a portion of the bottom wall of said casing being cut away to permit the free rotation of the said anti-glare element.

4. The combination with a wind shield having an opening therein, of an attachment for the wind shield comprising a substantially rectangular tube fitted into the opening and arranged to project forwardly therefrom, a shade plate rotatably carried by the rear end of the tube at the lower edge thereof, and means for holding the shade plate in an adjusted position.

5. The combination with a wind shield of an automobile having an opening therein, of an attachment for the wind shield comprising a tube fitted into the opening, and arranged to project forwardly therefrom, a shade plate rotatably carried by the rear end of the said tube, at the lower edge thereof, the shade plate being mounted at its longitudinal axis and provided with a clear portion on one side of the longitudinal axis and a colored portion on the opposite side of the longitudinal axis, the shade plate being mounted to permit either the clear or the colored portion thereof to be moved into alinement with the said tube or in a horizontal plane parallel with the bottom wall of the tube.

In testimony whereof I affix my signature.

RICHARD O. MYERS.